June 17, 1958  J. C. CACHERIS  2,839,683
MICROWAVE DUPLEXER-DETECTOR
Filed Oct. 9, 1956  3 Sheets-Sheet 1

INVENTOR.
JOHN C. CACHERIS
BY
W. E. Thibodeau, A. W. Dew & J. D. Edgerton
ATTORNEYS

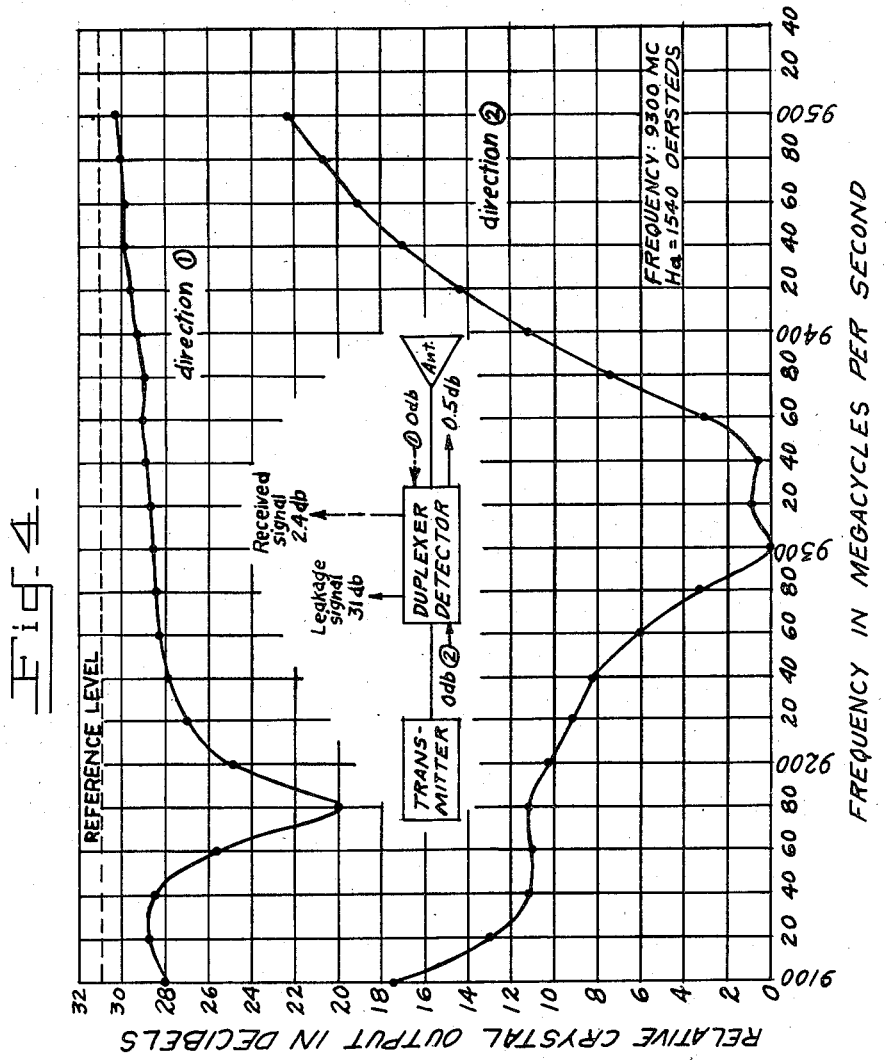

2,839,683

MICROWAVE DUPLEXER-DETECTOR

John C. Cacheris, Bethesda, Md., assignor to the United States of America as represented by the Secretary of the Army Application October 9, 1956, Serial No. 614,998

1 Claim. (Cl. 250—31)

(Granted under Title 35, U. S. Code (1952), sec. 266)

The invention described herein may be manufactured and used by or for the Government for governmental purposes without the payment to me of any royalty thereon.

This invention is related to means for detecting microwaves, and is particularly related to a microwave duplexer detector using ferrites.

It is an object of this invention to place ferrite slabs at a point in a microwave guide to distort the electric field of the microwave energy passing the point so that a crystal detector placed at the point may selectively distinguish between energy passing the point in one direction as against energy flowing past the point in an opposite direction.

The specific nature of the invention as well as other objects, uses and advantages thereof will clearly appear from the following description and from the accompanying drawing, in which:

Figure 3 shows a chart indicating the frequency dependence of the relative field intensities for the two directions of propagation.

Figure 4 shows a chart showing the over-all frequency dependence of a duplexer-detector in the above wave guide at a frequency of 9300 megacycles and with the ferrite slabs in a transverse magnetic field of 1100 oersteds.

Figure 1:
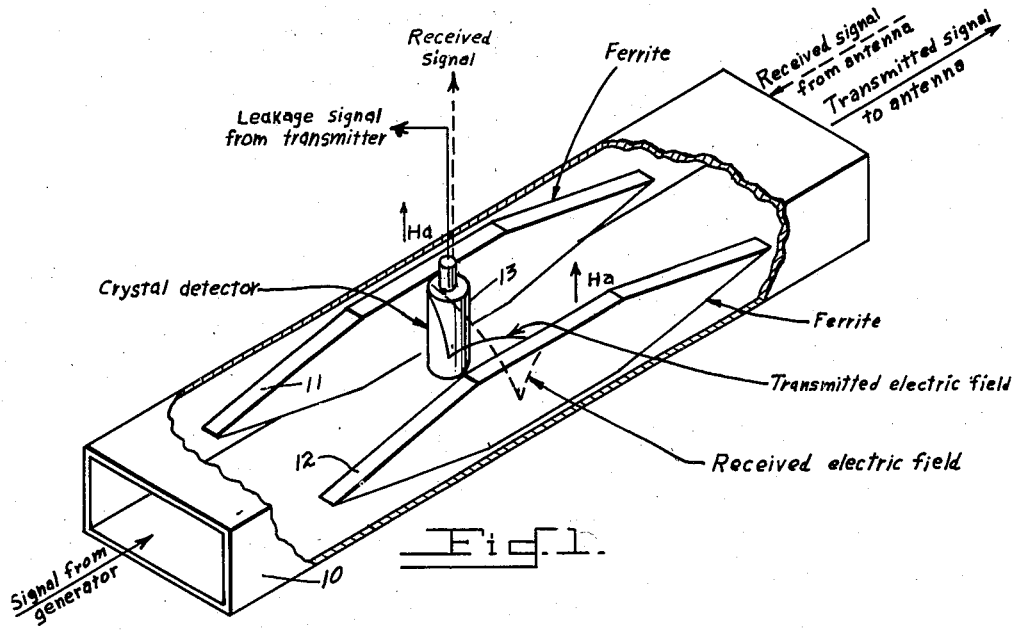
Figure 1 shows a portion of a rectangular wave guide containing ferrite slabs and a crystal detector, and with parts in plan and parts broken.

In Figure 1, a wave guide 10 is adapted to transmit a microwave signal at about 9300 megacycles from a source (not shown) to an antenna in one direction of energy flow, and to transmit a returned signal from the antenna in the opposite direction of energy flow. A pair of ferrite slabs, 11 and 12, are placed in the wave guide in the manner shown, and means (not shown) are provided to produce a magnetic field through the slabs as is indicated by the letters $Ha$. A crystal detector 13, is placed in the wave guide adjacent one of the slabs, and is connected to conventional current indicating means (not shown).

For the configuration shown in Figure 1, most of the energy transmitted in one direction from the source to the antenna goes around the crystal, while most of the received energy from the antenna is received by the crystal.

Figure 2:
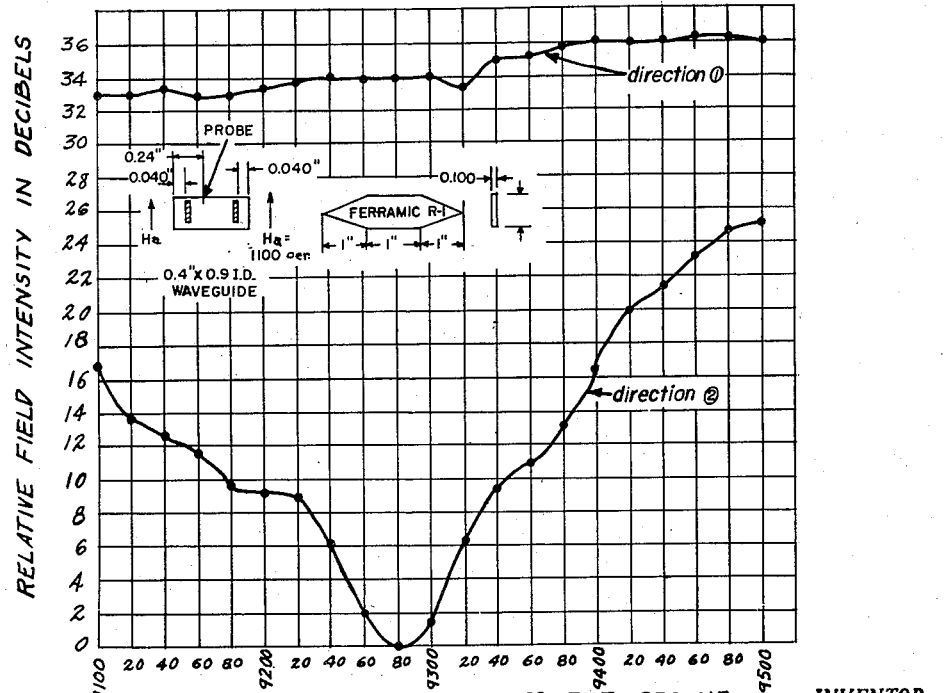
Figure 2 shows a chart to indicate the distortion of the electric field in the above wave guide when microwave energy of a given intensity is sent through the guide in opposite directions.
Figure 2:
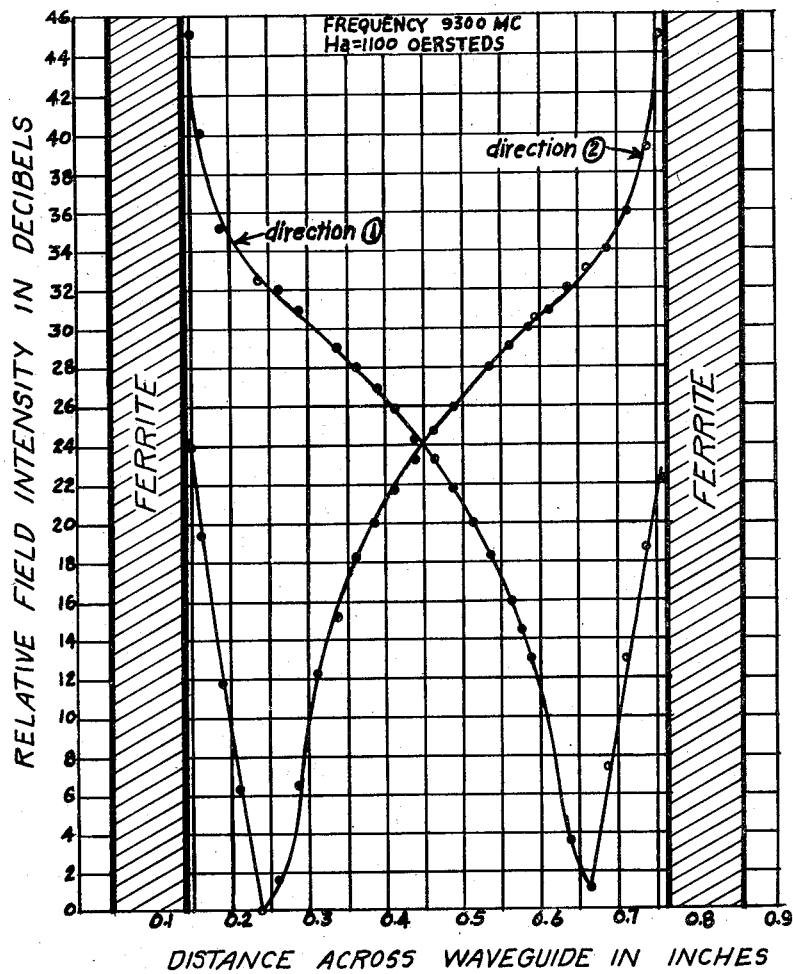

The severe distortion of the electric field in the presence of the ferrite slabs in a magnetic field of 1100 oersteds, and at a frequency of 9300 megacycles, is shown in Figure 2. Energy of the same intensity was sent through the wave guide in both directions, and tests were obtained by using a small probe. The dimensions of the rectangular guide were 0.4 by 0.9 inches I. D. At 0.24 inch from the side wall of the guide the relative electric field intensity for the propagation in direction 1 is about 33 db above that for direction 2, and a crystal detector located at this point would thus sample the different amounts of energy for the two directions of propagation.

A small probe, placed 0.24 inch from the wave guide wall, was used to measure the frequency dependence of the relative field intensities for the two directions of propagation, and the results of the tests are shown in Figure 3.

The over-all frequency dependence of a duplexer-detector designed for 9300 megacycles is shown in Figure 4. At the crystal detector the received signal (direction 1) is approximately independent of frequency, while the leakage signal from the energy transmitted in direction 2 from the source is rather frequency sensitive.

At 9300 megacycles the insertion loss of the signal transmitted through this device is 0.5 db, while the insertion loss of the signal received at the crystal is 2.4 db.

The leakage signal, which is 31 db down from the transmitted signal entering the device can be used as the local oscillator signal for a superheterodyne system. The amplitude of the leakage signal depends upon the position of the crystal relative to the null of the field distribution.

In the use of the device, let us assume that a signal is being transmitted through the guide from a source of energy at microwave frequency and that there is no received signal. The crystal detector is in the distorted electric field and not quite at the null or weakest part of the field, and a direct current meter connected to the crystal will indicate the rectified current from the crystal. Now, if some of this transmitted energy is returned to the guide from a reflector or an antenna, the crystal is in the strongest part of this returned electric field, and it will produce a rectified current which will modulate the first current, and the modulation of the first current by this second current can be detected by conventional means. The frequency of the second current may not be the same as the transmitted or first current when the second current is modified by Doppler effect.

In the use of the device in the laboratory the received current may well be a considerable part of the transmitted signal from the source when it is immediately reflected from a reflecting means at the load end of the guide.

The ferrite slabs shown and of the general dimensions shown worked well at the particular frequency used in the tests and with the magnetic field strength indicated (but the invention is not limited to ferrite slabs of the shapes and dimensions and to the magnetic field strength indicated) for illustrative purposes.

It will be apparent that the embodiments shown are only exemplary and that various modifications can be made in construction and arrangement within the scope of the invention as defined in the appended claim.

I claim:

In a transmitting and receiving system having a source of microwave energy and an antenna for transmitting and receiving microwave energy, an improved duplexer detector comprising in combination: a section of rectangular waveguide having a first end and a second end, microwave energy from said source being applied to said first end, said antenna being coupled to said second end, a pair of ferrite slabs having tapered ends disposed in said rectangular waveguide adjacent and parallel the short sides of said waveguide in spaced opposed relation, means producing a transverse magnetic field through said slabs for shifting a major portion of the transmitted energy to one side of the waveguide and for shifting a major portion of the received energy to the opposite side of the waveguide, and a crystal in said waveguide placed adjacent one of said slabs at a point closer to said opposite side such that the detected signal at the output of said crystal indicates a relatively small portion of the microwave energy passing through said waveguide from said first end to said second end, and a relatively large portion of the microwave energy passing through said waveguide from said second end to said first end.

References Cited in the file of this patent

UNITED STATES PATENTS 2,649,544   Zaleski ---------------- Aug. 18, 1953

OTHER REFERENCES

Fox et al.: "Behavior and Application of Ferrite in the Microwave Region," Bell System Technical Journal, vol. 34, No. 1, pp. 5 to 101, January 1955.

Weisbaum et al.: "A Double-Slab Ferrite Field Displacement Isolator at 11K mc.," Proceedings of the IRC, vol. 44, No. 4, pp. 554–555, April 1, 1956.